Figure 1:
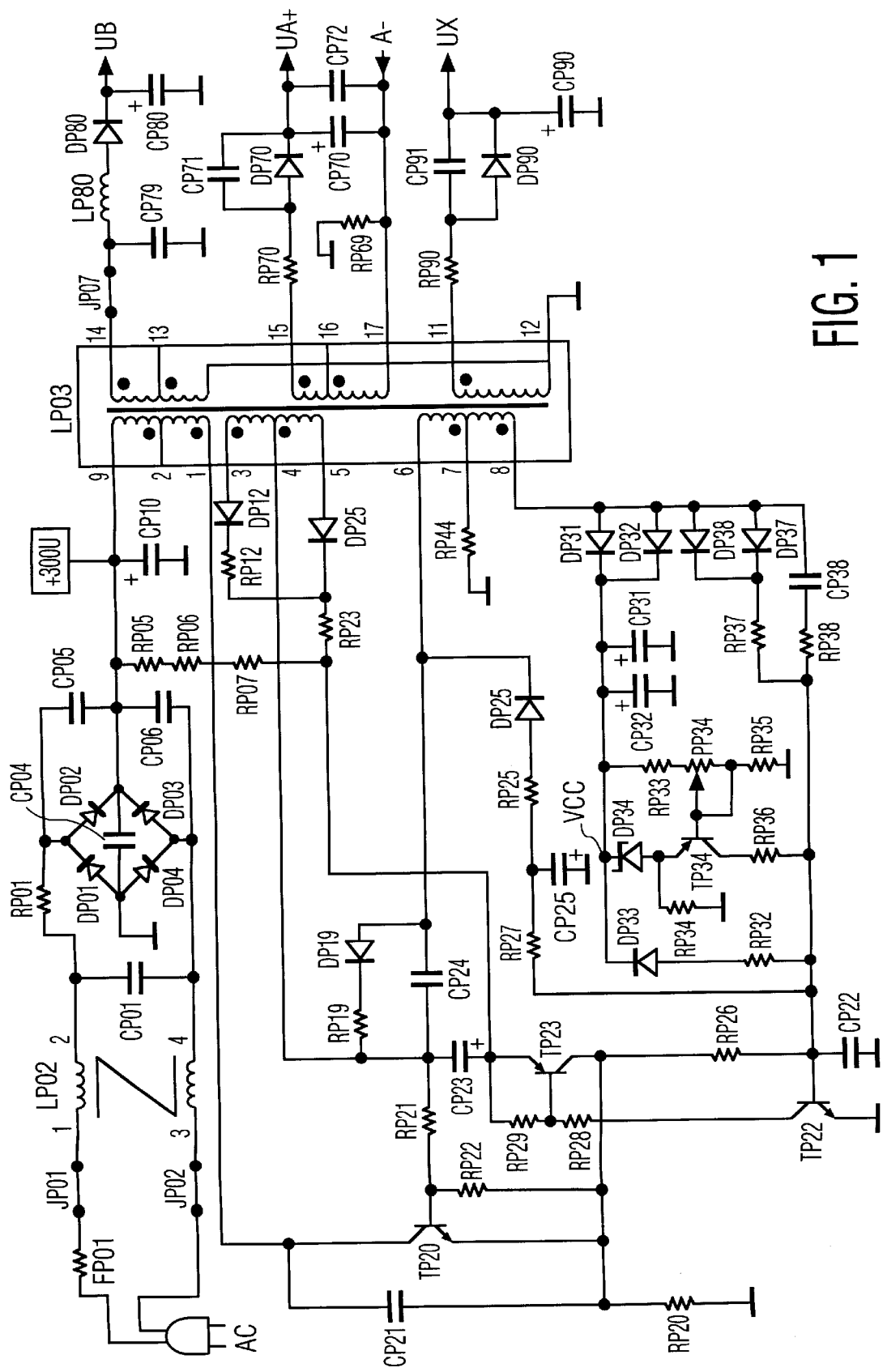

United States Patent [19]
Lohrer et al.

[11] Patent Number: 5,867,373
[45] Date of Patent: Feb. 2, 1999

[54] SWITCHED-MODE POWER SUPPLY

[75] Inventors: Stephan Lohrer, Aldingen; Jean-Paul Louvel; Peter Scharlach, both of Villingen-Schwenningen, all of Germany

[73] Assignee: Deutsche Thomson-Brandt GmbH, Villingen-Schwenningen, Germany

[21] Appl. No.: 847,025

[22] Filed: May 1, 1997

[30]     Foreign Application Priority Data

May 15, 1996  [DE]   Germany .................. 196 19 751.1

[51] Int. Cl.$^6$ .................................................. H02M 3/335
[52] U.S. Cl. ............................................ 363/19; 363/132
[58] Field of Search ................................ 363/18–19, 17, 363/37, 97, 98, 131, 132

[56]                References Cited

U.S. PATENT DOCUMENTS

| 4,802,076 | 1/1989 | Asai ........................................... 363/19 |
| 5,390,100 | 2/1995 | Palata ........................................ 363/19 |
| 5,406,469 | 4/1995 | Schwarz .................................... 363/21 |
| 5,657,218 | 8/1997 | Rilly et al. ................................. 363/97 |
| 5,675,479 | 10/1997 | Tani et al. ................................. 363/19 |

FOREIGN PATENT DOCUMENTS

| 4212472 | 4/1992 | Germany ...................... H02M 3/338 |
| 4431783 | 3/1994 | Germany ...................... H02M 3/335 |
| 0244276 | 10/1987 | Japan ............................ H02M 3/338 |

OTHER PUBLICATIONS

JP Patent Abstracts of Japan: 5–284747A, E–1503, Feb. 7, 1994 vol 18, No. 73. 5–168234A, E–1450, Oct. 20, 1993, vol. 17, No. 578 6–165489A, E–1606, Sep. 14, 1994, vol. 18, No. 493 5–244721A, E–1532, Mar. 31, 1994, vol. 18, No. 188.

*Primary Examiner*—Adolf Berhane
*Attorney, Agent, or Firm*—Joseph S. Tripoli; Joseph J. Laks; Marion P. Metelski

[57]              ABSTRACT

The invention relates to a switched-mode power supply having a switching transistor which periodically switches through a voltage which is applied to a primary winding of a transformer, having a base current network and having a switching stage for operating the switching transistor, and having a control stage for stabilizing a secondary voltage, the switching transistor having a switched-on phase, an off phase and an oscillation phase during operation. The switching transistor (TP20) of the switched-mode power supply according to the invention is switched through step by step during switching on, via a high-resistance resistor (RP05, RP06, RP07), a primary winding (6, 7) and a capacitor (CP24). After this, the switched-mode power supply oscillates autonomously via this winding (6, 7) and is controlled by the control stage (TP24). The switching transistor (TP20) switches through in a defined manner at the minimum of the first oscillation of the collector voltage, by means of a passive network (DP37, DP38, RP37) in parallel with the control stage (TP34). In consequence, the switch-on losses of the switching transistor are minimal. For a standby mode, the switched-mode power supply is provided with an additional network (CP38, RP38) which switches the switching transistor on for a defined time.

4 Claims, 1 Drawing Sheet

SWITCHED-MODE POWER SUPPLY

The present invention relates to a switched-mode power supply. Such a switched-mode power supply operates on the flyback converter principle, in which a switching transistor is switched through during a switched-on phase and magnetization is in consequence built up in a transformer, and the switching transistor is switched off during a switched-off phase and the magnetization is dissipated again via coupled windings of the transformer. In order to reduce the switch-on losses of the switching transistor, the switched-mode power supply additionally also has an oscillation phase in which the switching transistor is switched through at a voltage minimum of an oscillation of the collector-emitter voltage.

Switched-mode power supplies of this type have been disclosed, for example, in DE 44 31 783 and the journal Electronic World+Wireless World, December 1995, pages 1058–1063. These each contain an oscillator which predetermines the switching frequency of the switched-mode power supply.

The object of the present invention is to specify a switched-mode power supply without an oscillator, which has stable operation over a wide input voltage range and in which the switch-on losses of the switching transistor are minimal.

The switching transistor of the switched-mode power supply according to the invention is switched through step by step during switching on, via a high-resistance resistor, a primary winding and a capacitor. After this, the switched-mode power supply oscillates autonomously via a further primary winding in the transformer and is controlled by a control circuit in order to regulate the secondary voltages. There is no need for any additional free-running oscillator for operation of the switched-mode power supply. The starting circuit is designed with very high impedance, so that it consumes only a small amount of power during normal operation.

The switched-mode power supply varies the switching frequency of the switching transistor as a function of the load. For example, in normal operation, it oscillates at a frequency of about 50–100 kHz, and at about 20 kHz in a low-loss standby mode. Since the switching transistor would be switched on for only a very short time (>200 kHz) in the standby mode, the switched-mode power supply is provided with an additional network, which switches the switching transistor on for a defined time.

The switching transistor is switched through in a defined manner at the minimum or shortly before the minimum of the first oscillation of the collector voltage by means of a passive network in parallel with the control circuit. In consequence, the switch-on losses of the switching transistor are minimal.

The switched-mode power supply requires only a very small number of active components and is therefore very cost-effective. It has high stability even with fluctuating input voltages and with a fluctuating load. As a result of the low switching losses in the switching transistor, the frequency of this power supply can be designed to be considerably higher than in the case of a conventional flyback converter power supply in order to have the same overall power loss in the switching transistor. This higher frequency allows a smaller transformer size for the same transmitted power.

In addition, the switched-mode power supply contains a so-called soft start circuit which allows a smaller maximum collector current for the switching transistor in the starting phase than in normal operation. Since the soft-start circuit is controlled via a flyback voltage, only the small collector current as in the starting phase is still possible in the event of a short circuit on a secondary voltage (especially the system voltage), as a result of which the switching transistor is protected against overheating.

The invention can be used, in particular, for television sets and video recorders.

An advantageous exemplary embodiment of the invention is explained in the following text with reference to a schematic circuit diagram, in which: FIG. 1 shows a circuit diagram of a switched-mode power supply designed according to the invention.

The circuit diagram in FIG. 1 shows a mains voltage connection AC downstream from which a bridge rectifier is connected having diodes TP01–TP04 for rectification of the AC voltage. This rectified voltage is applied across a first primary winding with connections 9, 1 on a transformer LP03, a collector-emitter path of a switching transistor TP20, and a low-resistance resistor RP20 for current detection. The transformer LP03 has a second primary winding with connections 3, 4, 5, and a third primary winding with connections 6, 7, 8, as well as secondary windings 11–17 for producing stabilized secondary voltages UB, ±UA and UX. These are used, for example, in a television set for supplying the video section, the audio section and electronic circuits.

The switched-mode power supply operates on the flyback converter principle and has a switched-on phase, an off phase and, in addition, an oscillation phase after the off phase. During the switched-through phase, a current is built up in the primary winding 9, 1 and produces magnetization in the transformer LP03. After a certain magnetization level has built up, the switching transistor TP20 is switched off. In the off phase which now follows, the magnetization of the transformer LP03 is transmitted to the secondary windings 11–17 and is thus dissipated. During the transition from the switched-on phase to the off phase, the voltages which are present on the second primary winding 3, 4, 5 and on the third primary winding 6, 7, 8 are each reversed.

A damping capacitor CP21 is connected in parallel with the collector and emitter of the switching transistor TP20. This capacitor CP21 is used to avoid switching spikes while switching off, and is charged when the switching transistor TP20 is switched off. If the magnetization of the transformer LP03 falls below a specific value in the off phase, then oscillation takes place between the primary winding 1, 9 and the capacitor CP21. This characterizes the oscillation phase which follows the off phase. During this oscillation phase, the collector voltage of the switching transistor TP20 periodically falls to a voltage of 0 to 150V at the minimum of the oscillations, depending on the mains voltage, the turns ratio and the secondary load. The first minimum is the optimum time for switching the switching transistor TP20 through since the oscillation is at a maximum here and the oscillation time which is not used for power transmission is minimal.

The base of the switching transistor TP20 is driven by a base current network which has to satisfy the following requirements: on the one hand, it has to provide a sufficiently high positive base current during the switched-on phase for good saturation of the switching transistor TP20, and, on the other hand, it has to supply a high negative base current for rapid switching off and a negative base voltage during the off phase of the switching transistor TP20. The base current during the switched-through phase is provided via a forward winding 6, 7 of the third primary winding 6, 7, 8 via a diode DP19 and low-resistance resistors RP19 and RP21.

The switching transistor TP20 is switched off via a switching stage by means of transistors TP22 and TP23.

These transistors TP22 and TP23 are connected together via resistors RP26, RP28 and RP29 to form a Darlington circuit, which produces very rapid switching through. If the collector-emitter current of the switching transistor TP20 rises gradually in the switched-through phase, the voltage across the resistor RP20 rises at the same time. The transistor TP22 and thus the transistor TP23 are switched through above a voltage of about 0.7V across the resistor RP20. When the transistor TP23 switches through, the emitter and base of the switching transistor TP20 are connected to the connections of the capacitor CP23, as a result of which its negative charge and voltage desaturate the switching transistor TP20 very rapidly as a result of the large negative base current, and thus switch it off completely very rapidly. The capacitor CP23 is charged again during each switched-through phase via the secondary primary winding 3, 4, 5 and the diodes DP12 and DP23.

The secondary voltages UB, ±UA and UX are stabilized by a control stage on the primary side. A positive voltage VCC for supplying a transistor TP34 is picked off in the off phase from the primary winding 7, 8, via the diodes DP31 and DP32, for this purpose. This transistor TP34 supplies an offset current, which is dependent on the voltage VCC, for the capacitor CP22. The voltage on CP22 results from the addition of the voltage caused by this direct current and the voltage across the current measuring resistor RP20. When the voltage on the capacitor CP22 reaches approximately 0.7V, then the transistor TP22 and thus the transistor TP23 are switched on, and the switching transistor TP20 is thus switched off, as already described above.

In order to determine precisely the switching-on time of the switching transistor TP20 at the first minimum of the oscillation, a passive network is connected in parallel with the control stage TP34, which passive network has diodes DP37, DP38 and a resistor RP37 and, after the end of the off phase, supplies a positive current to the transistor TP22 via winding connection 8.

When the magnetization in the transformer LP03 decays in the off phase, the reverse voltages are reduced and all the forward voltages rise. A positive voltage is now available at the connection 6, and thus a positive current for switching on the base of the switching transistor TP20 via the diode DP19 is provided in RP19. Once the voltage at the connection 8 of the third primary winding 6, 7, 8 has fallen below 0V and no current is flowing any longer in TP22 because of the diodes DP37, DP38 and the resistor RP37, TP22 and 23 still remain switched on as a result of their saturation. The switching transistor TP20 is not switched through until after the transistors TP22 and TP23 have switched off. If the matching is optimum, this switching through takes place at the minimum of the oscillation of the collector voltage of TP20.

In order to switch the switched-mode power supply on, a resistor chain RP05, RP06 and RP07 is connected between the positive connection of the bridge rectifier DP01–DP04 and the positive connection of the capacitor CP23. In addition, a capacitor CP24 is also connected in parallel with the resistor RP19 and the diode DP19. The resistor chain RP05–RP07 has very high resistance in order to keep low the losses which occur in these resistors even during operation, and it is therefore not sufficient to switch the transistor TP20 on in the starting phase. Positive feedback is therefore used to start the switched-mode power supply, when the switched-mode power supply is switched on, a small current flows through the resistor chain RP05–RP07 via the capacitor CP23 to the base of the switching transistor TP20 and, in consequence, produces a small collector current. This current flows via the first primary winding 9, 1 and in consequence produces a small induced voltage in the third primary winding 6, 7, which leads to a current which now switches the base of the switching transistor TP20 on further via the capacitor CP24. The increase in the collector current produced in this way causes the magnetization in the transformer LP03 to be further increased, and the switching transistor TP20 is switched through step by step by this positive feedback, until it is completely open. The starting current from the rectified (or unrectified) mains voltage (via RP05–07) can be greatly reduced by means of a larger capacitor (CP24). This starting circuit is not limited to switched-mode power supplies having an oscillation phase, and can also be used for other flyback converter power supplies.

In addition, the switched-mode power supply contains a so-called soft start circuit, comprising the resistors RP25 and RP27 connected in series with the diode DP25 and the capacitor CP25, which is connected between the two resistors RP25 and RP27 and earth, which soft start circuit connects the capacitor CP22 to the winding 6. The voltage which is produced across the capacitor CP22 increases the maximum permissible collector current (detected across RP20) in proportion to the flyback voltages. This circuit produces a soft start and a minimal collector current in the event of a short circuit on a secondary voltage.

In the standby mode, the power output on the secondary side of the switched-mode power supply is very small, for example less than 3W. The switched-through time of the switching transistor TP20 would then be very short, for example approximately 200 ns. This corresponds to a very high frequency, at which the switching transistor TP20 has been switched through very poorly and therefore has a high power loss. In order to optimize the switched-on phase of the switching transistor TP20 in the standby mode, a passive network comprising a resistor RP38 and a capacitor CP38 is arranged in parallel with the control stage TP34. When the switching transistor TP20 is switched through, the voltage on the one turn 8 is negative. The capacitor CP38 now draws a negative current from the capacitor CP22 and the transistor TP22. In consequence, the transistor TP22 is briefly switched off completely, and the switching transistor TP20 is switched through. A good switching behaviour for TP20 is achieved by lengthening the switched-on phase of the switching transistor TP20 to more than 1 $\mu$s, or alternatively more energy than necessary would have to be stored in the transformer LP03. This reduces the switching frequency to approximately 20 kHz. This network for producing a minimum switched-on duration of a switching transistor is not limited to switched-mode power supplies having an oscillation phase and can also be used for other flyback converter power supplies.

The invention proposed here is a further development of the Patent Application described in DE 4431783. It has considerably improved stability over a wide input voltage range and load voltage range and, in addition, is constructed with considerably fewer components. The losses which occur in the switched-mode power supply during operation are likewise very low, and the size of the transformer is reduced.

The dimensions of the important components in the switched-mode power supply in FIG. 1 are:

| Resistance R/Ohm: | | Capacitance C: | | |
|---|---|---|---|---|
| RD05 | 120 k | CP10 | 100 | $\mu$F |
| RD06 | 120 k | CP21 | 470 | pF |
| RD07 | 120 k | CP22 | 1.5 | nF |
| RD12 | 0.22 | CP23 | 100 | $\mu$F |
| RD23 | 0.33 | CP24 | 10 | nF |
| RD19 | 39 | CP25 | 1 | $\mu$F |
| RD20 | 1 | CP31 | 32 | $\mu$F |
| RD21 | 4.7 | CP38 | 10 | pF |
| RD22 | 4k7 | | | |

-continued

| Resistance R/Ohm: | | Capacitance C: | |
|---|---|---|---|
| RD25 | 1 k | DP33 | ZPD24 |
| RD26 | 1 k | DP34 | ZPD6U8 |
| RD27 | 8k2 | | |
| RD28 | 10 | | |
| RD29 | 1 k | | |
| RD32 | 1 k | | |
| RD33 | 3 k | | |
| RD34 | 1 k | | |
| RD35 | 3 k | | |
| RD36 | 3k9 | | |
| RD37 | 15 k | | |
| RD38 | 10 k | | |
| RD44 | 0.33 | | |

We claim:

1. A switched-mode power supply, comprising:

a transformer;

a switching transistor coupled in series to a first primary winding of said transformer for periodically switching an input voltage applied to said first primary winding, said switching transistor having a switched-on phase of operation, an off phase of operation, and an oscillation phase of operation occurring subsequent to said off phase;

a switching stage for changing the conductive state of said switching transistor;

a base current network for providing a base current to said switching transistor from a second primary winding of said transformer;

a control stage coupled between said second primary winding and said switching stage for stabilizing a secondary voltage, said control stage cooperating with said second primary winding such that said switched-mode power supply oscillates autonomously; and a network having a resistor coupled in series to at least one diode in the forward direction of said diode for influencing the switch-on delay of said switching transistor, said network being arranged in parallel with said control stage.

2. A switched-mode power supply according to claim 1, wherein the size of said resistor is dimensioned such that the switch-on delay occurs approximately at or shortly before the minimum of the first cycle of said oscillation phase.

3. A switched-mode power supply comprising:

a transformer;

a switching transistor coupled in series to a first primary winding of said transformer, said switching transistor periodically switching an input voltage applied to said first primary winding;

a switching stage for changing the conductive state of said switching transistor;

a base current network for providing a base current to said switching transistor from a second primary winding of said transformer;

a control stage coupled between said second primary winding and said switching stage for stabilizing a secondary voltage; and a network having at least one capacitor coupled in series with one resistor, said network arranged in parallel with said control stage in order to produce a minimum switch-on duration for said switching transistor at low-load conditions of said switched-mode power supply and in a standby mode of operation of said switched-mode power supply.

4. A switched-mode power supply, comprising:

a transformer;

a switching transistor coupled in series to a primary winding of said transformer for periodically switching an input voltage applied to said primary winding, said switching transistor having a switched-on phase of operation, an off phase of operation, and an oscillation phase of operation occurring subsequent to said off phase;

a switching stage for changing the conductive state of said switching transistor;

a base current network for providing a base current to said switching transistor from a second primary winding of said transformer;

a control stage coupled between said second primary winding and said switching stage for stabilizing a secondary voltage; and a high-resistance path coupling said input voltage to said base current network, said high-resistance path supplying said base current network with a current independently of said transformer;

wherein said base current network comprises a capacitance which supplies a current impulse in the switched-on phase of said switching transistor such that positive feedback is produced between said switching transistor and said second primary winding for incrementally supplying a base current to said switching transistor from said second primary winding through said base current network.

* * * * *

UNITED STATES PATENT AND TRADEMARK OFFICE
CERTIFICATE OF CORRECTION

PATENT NO. : 5,867,373
DATED : Feb. 2, 1999
INVENTOR(S) : Stephan Lohrer; Jean-Paul Louvel; and Peter Scharlach It is certified that error appears in the above-identified patent and that said Letters Patent is hereby corrected as shown below:

Title page, item [56] under "OTHER PUBLICATIONS", change "5-244721A" to --5-344721A--.

Signed and Sealed this

Twenty-seventh Day of July, 1999

Attest:

Attesting Officer

Q. TODD DICKINSON

Acting Commissioner of Patents and Trademarks